US012747123B2

(12) United States Patent
Nomura

(10) Patent No.: US 12,747,123 B2
(45) Date of Patent: Sep. 29, 2026

(54) SHEET CONVEYING APPARATUS AND PRINTER

(71) Applicant: Toshiba Tec Kabushiki Kaisha, Tokyo (JP)

(72) Inventor: Susumu Nomura, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 126 days.

(21) Appl. No.: 18/741,689

(22) Filed: Jun. 12, 2024

(65) Prior Publication Data

US 2025/0145400 A1 May 8, 2025

(30) Foreign Application Priority Data

Nov. 6, 2023 (JP) ................................ 2023-189023

(51) Int. Cl.
*B65H 20/02* (2006.01)
*B41J 15/04* (2006.01)

(52) U.S. Cl.
CPC ............ *B65H 20/02* (2013.01); *B41J 15/042* (2013.01); *B65H 2553/412* (2013.01); *B65H 2553/81* (2013.01); *B65H 2801/03* (2013.01)

(58) Field of Classification Search
CPC .... B41J 15/042; B65H 20/02; B65H 2553/81; B65H 2553/412; B65H 2801/03
See application file for complete search history.

(56) References Cited

U.S. PATENT DOCUMENTS 9,016,966 B2 4/2015 Fujita et al.

FOREIGN PATENT DOCUMENTS

JP 2014-073884 A 4/2014
JP 2017-052579 A 3/2017

OTHER PUBLICATIONS

Notice of Reasons for Refusal mailed May 12, 2026 in corresponding Japanese Patent Application No. 2023-189023, 8 pages (with Translation).

*Primary Examiner* — Christopher E Mahoney
*Assistant Examiner* — Marissa Ferguson-Samreth
(74) *Attorney, Agent, or Firm* — Kim & Stewart LLP

(57) ABSTRACT

A sheet conveying apparatus includes a roller for conveying a sheet along a conveyance path, a first sensor holder including a first sensor element that faces a first surface of the conveyed sheet, the first holder being movable along a direction perpendicular to the path, a second sensor holder including a second sensor element that faces a second surface of the conveyed sheet, the second holder being movable along the direction, an interlocking member connected to the first holder such that the interlocking member and the first holder move together in opposite directions along the direction, and a connecting member bent to partially surround the path and connects the interlocking member and the second holder such that the interlocking member and the second holder move together in opposite directions along the direction.

20 Claims, 12 Drawing Sheets

SHEET CONVEYING APPARATUS AND PRINTER

CROSS-REFERENCE TO RELATED APPLICATION(S)

This application is based upon and claims the benefit of priority from Japanese Patent Application No. 2023-189023, filed Nov. 6, 2023, the entire contents of which are incorporated herein by reference.

FIELD

Embodiments described herein relate generally to a sheet conveying apparatus and a printer.

BACKGROUND

Conventionally, a sheet conveying apparatus that conveys a strip-shaped sheet has been widely used. The sheet conveying apparatus is provided in, for example, a printer that prints on a strip-shaped sheet. Examples of the strip-shaped sheet include a label sheet and a ticket sheet. The label sheet includes a strip-shaped base sheet and multiple labels attached to the base sheet at regular intervals. The ticket sheet is printed and cut to form a ticket having a predetermined size. The label sheet or the ticket sheet is a printing medium on which misalignment of a printed image is unacceptable. Thus, a sheet conveying apparatus that handles such a sheet includes a detection unit that detects a position of the sheet in its conveyance path.

The detection unit detects a position in the length direction of the sheet by detecting a symbol such as a mark formed at a predetermined position in the width direction of the sheet. The position of the symbol in the sheet width direction varies depending on the specifications of the sheet. For this reason, a sheet conveying apparatus includes a mechanism for moving the detection unit in the sheet width direction.

In a case where the detection unit includes sensor elements on both sides of the front surface side and the back surface side of the sheet, the above-described mechanism needs to keep the position of both sensor elements to be overlapped with each other on the upper and lower sides of the sheet. In this case, the mechanism tends to be large in the sheet width direction because the sensor elements need to be moved in the sheet width direction while being held in a state of being overlapped with each other in the vertical direction, which is a factor that hinders miniaturization and space saving for the sheet conveying apparatus.

SUMMARY OF THE INVENTION

Embodiments of the present disclosure provide a sheet conveying apparatus and a printer capable of saving a space occupied by a structure for adjusting a position in a sheet width direction of a detection unit for detecting a position of a sheet in a length direction.

In one embodiment, a sheet conveying apparatus comprises a roller for conveying a sheet along a conveyance path, a first sensor holder including a first sensor element that faces a first surface of the sheet when the sheet is conveyed, the first sensor holder being movable along a first direction that is perpendicular to the conveyance path, a second sensor holder including a second sensor element that faces a second surface of the sheet when the sheet is conveyed, the second surface being opposite to the first surface, the second sensor holder being movable along the first direction, an interlocking member mechanically connected to the first sensor holder such that the interlocking member and the first sensor holder move together in opposite directions along the first direction, and a connecting member that is bent to partially surround the conveyance path and connects the interlocking member and the second sensor holder such that the interlocking member and the second sensor holder move together in opposite directions along the first direction.

DETAILED DESCRIPTION

Hereinafter, embodiments will be described in detail with reference to the drawings. The present disclosure is not limited to the embodiments described below.

Figure 1:
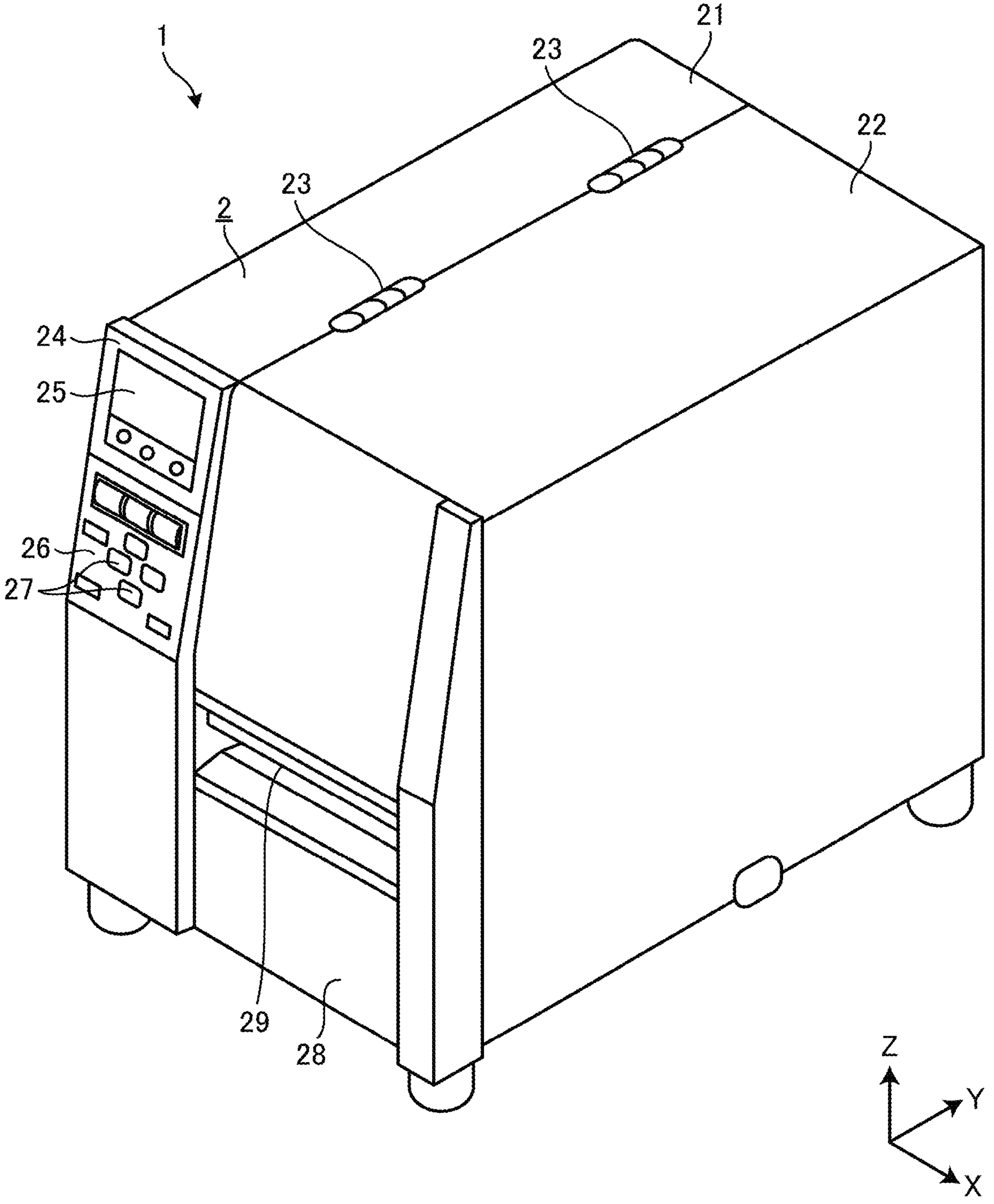
FIG. 1 is a perspective view of an external appearance of a printer according to an embodiment.

FIG. 1 is a perspective view illustrating an external appearance of a printer 1 according to an embodiment. For convenience of explanation, a three-dimensional coordinate system is shown in the drawings. In the three-dimensional coordinate system, the width direction or left-right direction of the printer 1 is defined as the X-axis direction, the depth direction or front-rear direction is defined as the Y-axis direction, and the height direction or up-down direction is defined as the Z-axis direction. The three axes of the X axis, the Y axis, and the Z axis are orthogonal to each other. The positive direction of the Z-axis is a direction from the bottom to the top of the printer 1. The positive direction of the Y-axis is a direction from the front side to the back side of the printer 1, and the negative direction of the Y-axis is a direction from the back side to the front side. The positive direction of the X-axis is a direction from left to right when viewed from the front side or in the negative direction of the Y-axis.

The printer 1 is an example of a sheet conveying apparatus, and prints images and/or text on a sheet. A housing 2 of the printer 1 is divided into left and right, and includes a left case 21 and a right case 22. The left case 21 and the right case 22 are connected by a hinge portion 23.

The hinge portion 23 rotatably connects the right end of the upper surface of the left case 21 and the left end of the upper surface of the right case 22. Thus, the right case 22 is rotatable about the hinge portion 23 with respect to the left case 21, and functions as a lid for opening and closing the housing 2.

The right case 22 moves between a closed position at which the housing 2 is closed (see FIG. 1) and an open position at which the housing 2 is opened (see FIG. 2, which will be described later) in accordance with the above-described rotation. When the right case 22 is at the open position, the right case 22 is above the left case 21 and the upper surface of the right case 22 faces the upper surface of the left case 21.

A front panel 24 constituting the front portion of the left case 21 includes a display unit 25 and an operating unit 26. The display unit 25 is constituted by, for example, a liquid crystal display (LCD) with a backlight, but other types of display devices may be used. The operating unit 26 includes a plurality of operation buttons 27. Each operation button 27 receives an operation by an operator.

The left case 21 houses, in addition to the above-described components, a processor such as a central processing unit (CPU), a read only memory (ROM), a random access memory (RAM), electronic components such as non-volatile memories, motors, and the like. The CPU performs various functional units for operating the printers 1 by loading and executing programs stored in the ROM onto the RAM.

A sheet discharge port 29 is provided in the front panel 28 constituting the front portion of the right case 22. The sheet discharge port 29 is an opening for discharging a sheet after printing.

Figure 2:
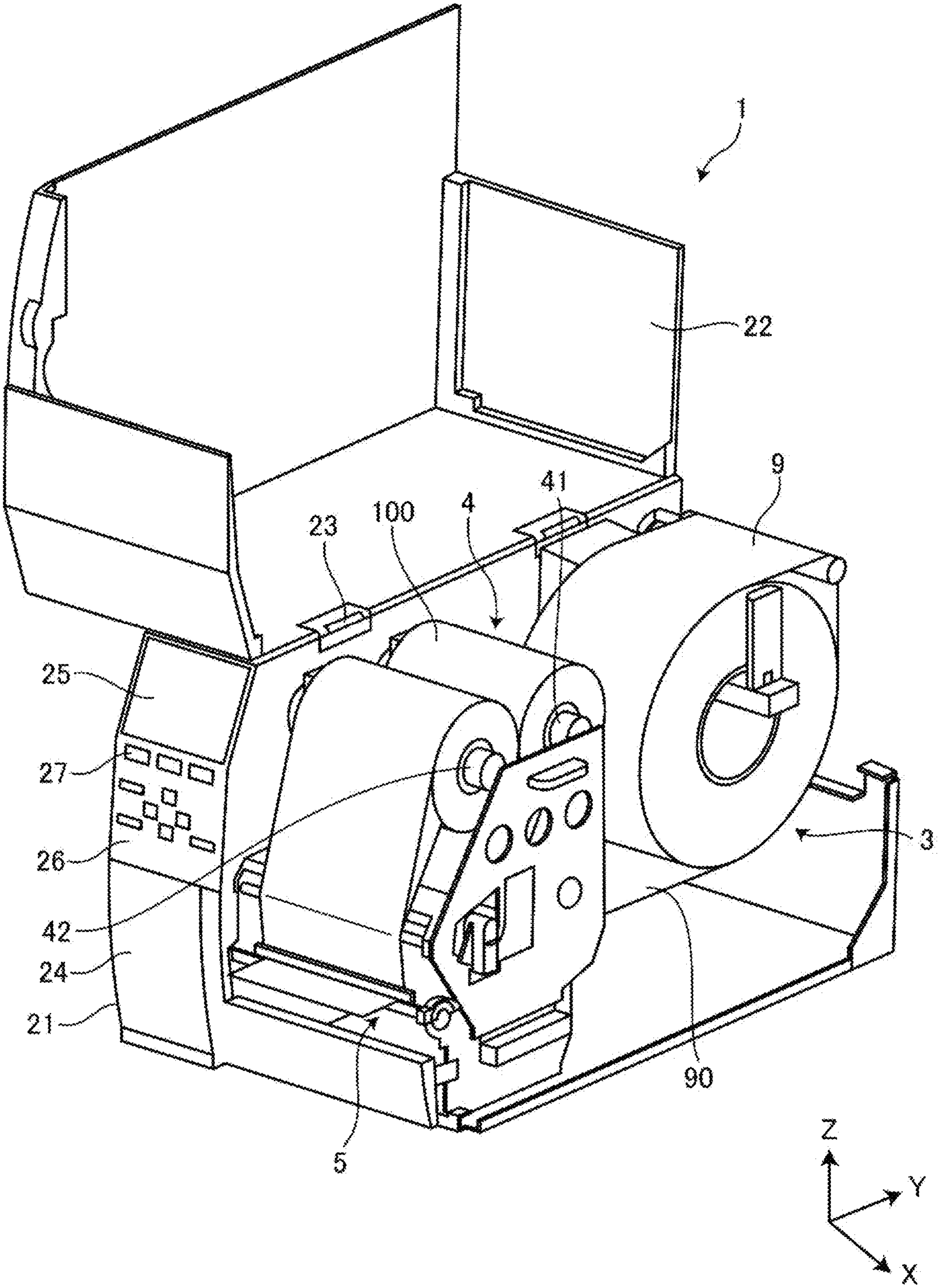
FIG. 2 is a perspective view of the printer in a state where a housing is opened.
Figure 3:
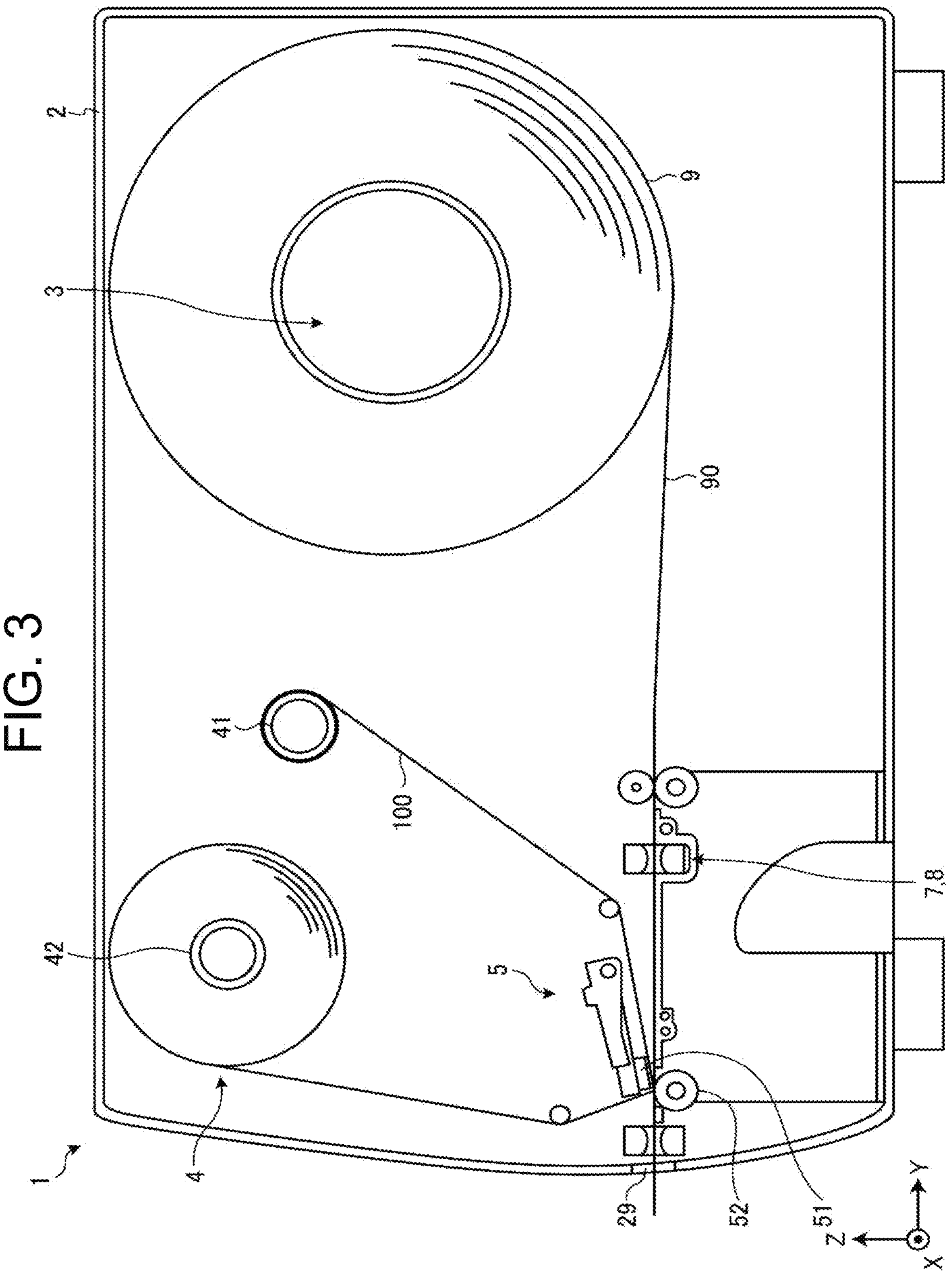
FIG. 3 is a schematic cross-sectional view of an internal structure of the printer.

FIG. 2 is a perspective view of the printer 1 in a state where the housing 2 is opened. FIG. 3 is a schematic cross-sectional view illustrating an example of an internal structure of the printer 1. The printer 1 includes a sheet storage unit 3, a ribbon holding unit 4, a printing unit 5, and a detection unit 7 inside the housing 2.

The sheet storage unit 3 stores a roll sheet 9 in such a manner that a strip-shaped sheet 90 can be pulled out. The roll sheet 9 is formed by winding the strip-shaped sheet 90.

The printing unit 5 prints on the surface of the sheet 90, and includes a print head 51 and a platen 52. The print head 51 is, for example, a line thermal head. The platen 52 is a roller having a surface formed of, for example, an elastic material, and rotates by a driving force of a motor or the like. The sheet 90 sandwiched between the platen 52 and the print head 51 is conveyed in accordance with the rotation of the platen 52. The print head 51 performs printing on the conveyed sheet 90. The sheet 90 that has passed through the printing unit 5 is discharged from the sheet discharge port 29.

The ribbon holding unit 4 includes a supply shaft 41 and a winding shaft 42, and holds an ink ribbon 100. The ink ribbon 100 has a belt shape, and a wound portion before the supply is supported by the supply shaft 41, and a portion after passing through the printing unit 5 is wound up by the winding shaft 42. The ink ribbon 100 is sandwiched between the print head 51 and the platen 52 together with the sheet 90. The thermal ink applied to the ink ribbon 100 is heated and melted by the print head 51, and is transferred to the sheet 90.

Figure 4:
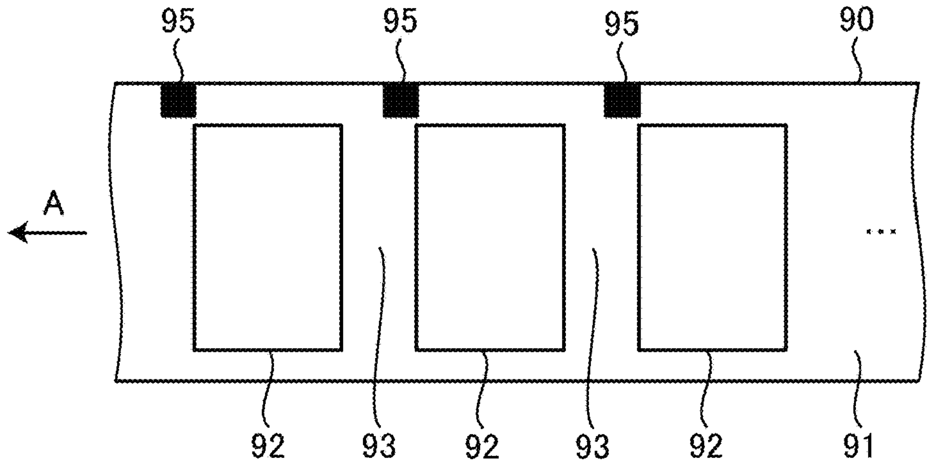
FIG. 4 is a diagram of a sheet.

FIG. 4 is a diagram illustrating an example of the sheet 90. There are various types of sheet 90, and in addition to a simple strip-shaped sheet, there is a label sheet in which a plurality of labels 92 are attached to a strip-shaped base sheet 91 as shown in FIG. 4, for example. The label 92 is formed by providing a glue layer having an adhesive property on one surface of a sheet having a predetermined size. The sheet may be paper or a resin film.

The labels 92 are attached to the strip-shaped base sheet 91 at substantially equal intervals, and a gap 93 having a predetermined dimension is provided between adjacent labels 92. In order to stabilize the printing position of an image on the label 92, it is necessary to detect the position of the label 92 on the base sheet 91 before performing printing. Therefore, the detection unit 7 detects the position of the label 92 on the base sheet 91.

The sheet 90 includes, for example, a continuous ticket sheet such as an admission ticket. When the sheet 90 is printed and cut, it becomes a ticket or a tally. The sheet 90 as the ticket sheet is often not a plain sheet on which a background image or general information is printed in advance, and deviation of the printing position of an image by the printing unit 5 is not allowed. In some cases, a black mark is printed on the back surface of the sheet 90 to indicate the cut position of the ticket.

The black mark is, for example, a black rectangular mark that absorbs light, as indicated by reference numeral 95 in FIG. 4 (hereinafter referred to as a black mark 95). The black mark 95 is generally provided at either of the left and right end portions in the sheet width direction or at the center portion in the sheet width direction.

Note that, although the black mark 95 has been described above as an example for indicating the cut position of the ticket on the ticket sheet, the black mark 95 is also used for other purposes, such as for indicating the position of the label 92 on the label sheet.

The detection unit 7 includes, for example, a transmission sensor or a reflection sensor, and detects a detection target. The detection target is, for example, a label 92, a gap 93 between adjacent labels 92, and a black mark 95 provided on the back surface of the sheet 90. The output of the detection unit 7 is used to determine the printing position of an image on the sheet 90. For convenience of explanation, a processing unit that determines a printing position of an image based on an output from the detection unit 7 is hereinafter referred to as a determination unit. A processing unit that controls the printing position based on the determination by the determination unit is referred to as a control unit. In one embodiment, the determination unit and the control unit are software modules executed by the processor. In another embodiment, the functions of one or both of the units are performed by dedicated circuits.

The transmission sensor includes a lighting unit and a light receiving unit. The lighting unit and the light receiving unit are disposed so as to sandwich the sheet 90 therebetween. The light receiving unit receives light emitted by the lighting unit when the sheet 90 is not present between the lighting unit and the light receiving unit, or when the base sheet 91 is thin enough to transmit light.

When the light receiving unit receives the light emitted from the lighting unit of the transmission sensor, the determination unit determines, based on the output of the detection unit 7 indicating this, whether the sheet 90 is present or the position where the light is transmitted through the base sheet 91, that is, the label 92 is not present. Further, when the light receiving unit does not detect the light with the conveyance of the sheet 90, the determination unit determines that the edge of the label 92 has been detected based on the output of the detection unit 7 indicating this. The control unit controls the rotation of the platen 52 so that the sheet 90 is conveyed by a predetermined length from the time when the edge of the label 92 is detected, thereby aligning the label 92 with respect to the print head 51.

The reflection sensor includes a lighting unit and a light receiving portion facing the back surface of the sheet 90. When the sheet 90 is present, the light emitted from the lighting unit of the reflection sensor is reflected by the sheet 90, and the light receiving unit receives the reflected light. When the sheet 90 does not exist, the light receiving unit does not detect light, and therefore, the determining unit determines that the sheet 90 does not exist based on the output of the detection unit 7 indicating this.

Further, when the light emitted from the lighting unit of the reflection sensor reaches the black mark 95 on the back surface of the sheet 90, the light is not reflected and the light receiving unit does not detect the light. Based on the output of the detection unit 7 indicating this, the determination unit determines that the black mark 95 has been detected.

The determination criterion of the determination unit and the control content of the control unit are set in advance in association with, for example, a combination of the type of the sheet 90 and the type of the output of the detection unit 7, and are stored in the non-volatile memory.

As described above, in the printer 1, the detection unit 7, the determination unit, and the control unit determine and control the printing positions of various types of sheets 90 such as label sheets and ticket sheets.

Here, the black mark 95 is not generally provided in the entire area in the width direction of the sheet 90, but is provided in a partial region such as a center portion in the width direction or one side end portion in the width direction of the sheet 90. Therefore, when the sheet 90 including the black mark 95 is used, the detection unit 7 needs to be disposed at a position where the black mark 95 can be detected. Therefore, the printer 1 includes a detection position adjustment unit 8 for moving the detection unit 7 in the sheet width direction when adjusting the position of the detection unit 7.

The detection unit 7 of the present embodiment is integrally provided with the transmission sensor and the reflection sensor. Therefore, the detection position adjustment unit 8 moves the detection unit 7 in the sheet width direction while keeping the lighting unit and the light receiving unit of the transmission sensor in a positional relationship facing each other. Hereinafter, the detection position adjustment unit 8, which is a structure for making the detection unit 7 move along the sheet width direction, will be described.

In the present embodiment, the printer 1 shown in FIGS. 1 to 3 is described as an example, but embodiments can apply to any printer that prints on a strip-shaped sheet 90 and detects the position thereof by the detection unit 7. For example, the detection unit 7 and the detection position adjustment unit 8 of the present embodiment may be employed in an in-line printer that is incorporated in a production line and performs printing.

Figure 5:
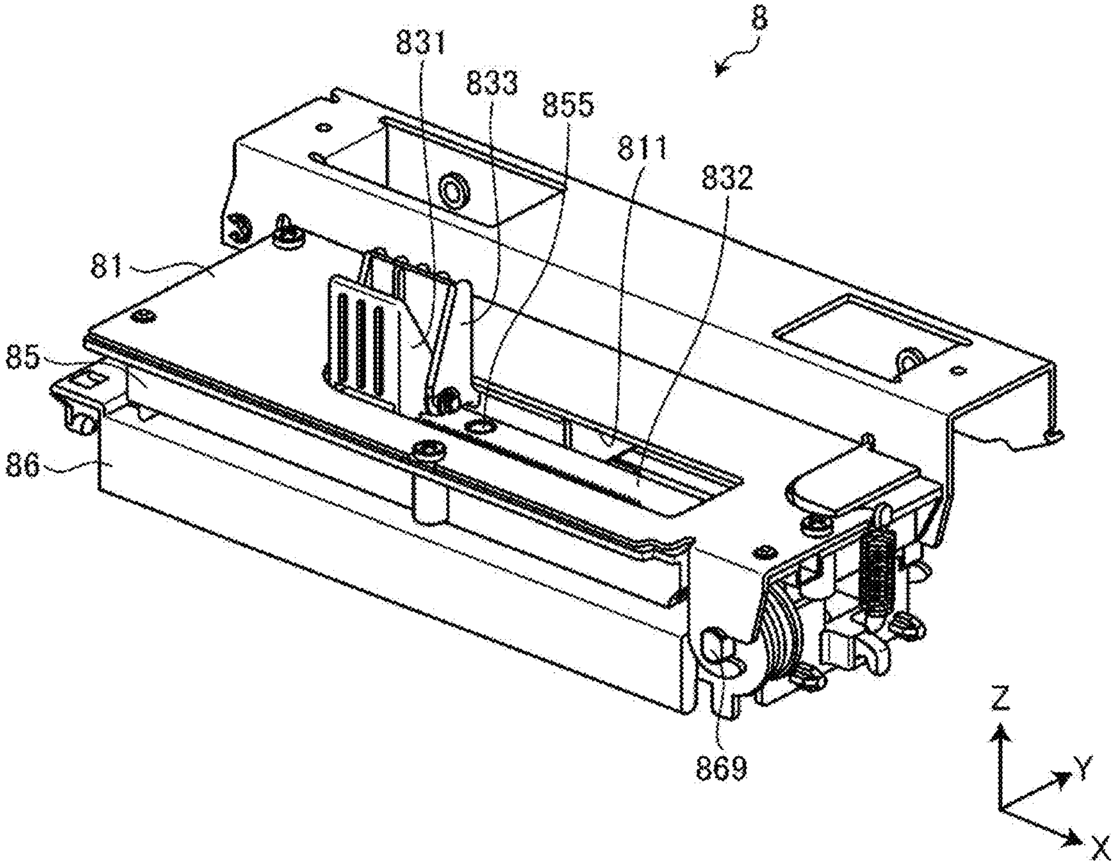
FIG. 5 is a perspective view of an external appearance of a detection position adjustment unit.
Figure 6:
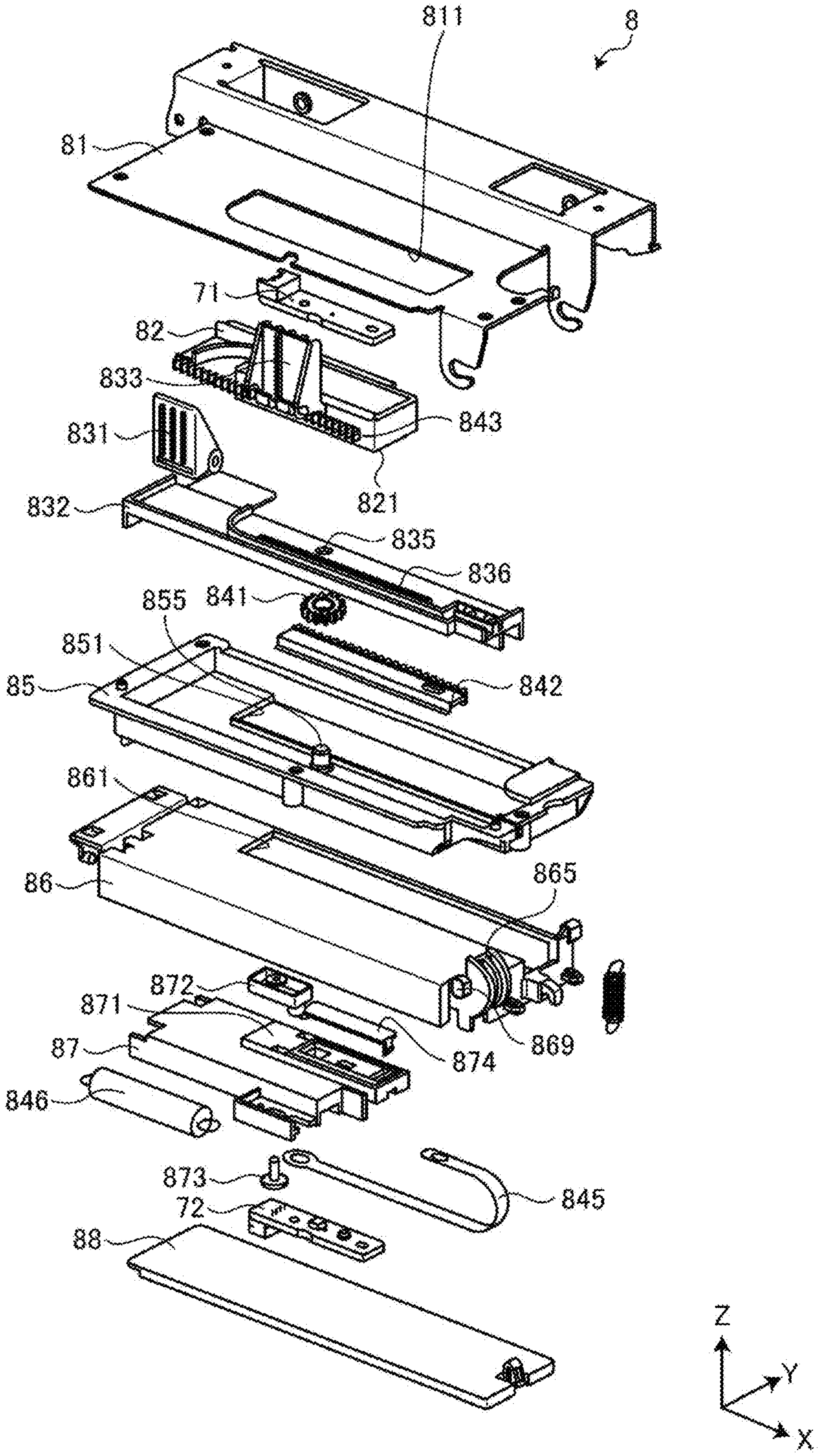
FIG. 6 is an exploded perspective view of the detection position adjustment unit.

FIG. 5 is a perspective view illustrating an external appearance of the detection position adjustment unit 8. FIG. 6 is an exploded perspective view of the detection position adjustment unit 8. The detection position adjustment unit 8 includes a front unit cover 81, a first sensor holder 82, a pinch 831, a rail member 832, a pinion gear 841, an interlocking rack 842, a front unit casing 85, a back unit casing 86, a second sensor holder 87, a back unit cover 88, and the like, and these units overlap from top to bottom in the order of enumeration.

The front unit cover 81 and the front unit casing 85 house the first sensor board 71, the first sensor holder 82, the pinch 831, the rail member 832, the pinion gear 841, the interlocking rack 842, and the like between each other to protect them. The back unit casing 86 and the back unit cover 88 house and protect the second sensor holder 87, the second sensor substrate 72, and the like between each other.

The front unit casing 85 faces the front or print surface of the sheet 90. The back unit casing 86 faces the rear surface of the sheet 90. That is, the front unit casing 85 and the back unit casing 86 are positioned across the sheet conveyance path. The front unit cover 81, the front unit casing 85, and the members therebetween are rotatable about a rotation shaft 869 provided at one end of the back unit casing 86. With this rotation, the detection position adjustment unit 8 opens and closes the sheet conveyance path.

The first sensor holder 82 holds the first sensor substrate 71. The second sensor holder 87 holds the second sensor substrate 72. The first sensor substrate 71 and the second sensor substrate 72 constitute the detection unit 7. The first sensor substrate 71 is disposed on the front side of the sheet 90, and includes one of the lighting unit and the light receiving portion of the transmission sensor. The second sensor substrate 72 is disposed on the back side of the sheet 90, and holds the other of the transmission sensor and the lighting unit and the light receiving unit of the reflection sensor. Note that the lighting unit and the light receiving unit are examples of sensor elements that face the front surface or the back surface of the sheet 90.

Figure 7:
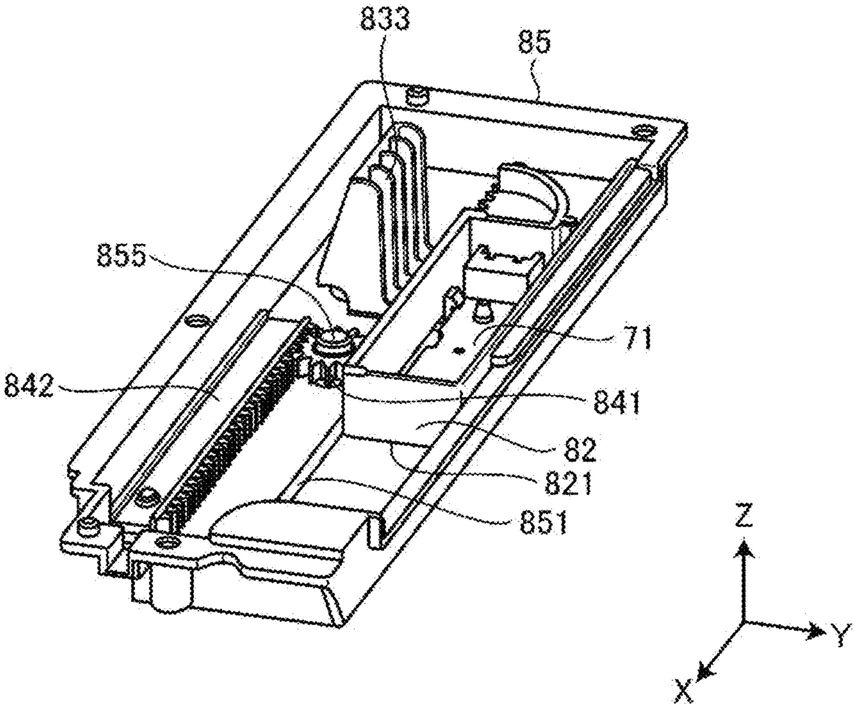
FIG. 7 is a perspective view of inside of a front unit casing.
Figure 8:
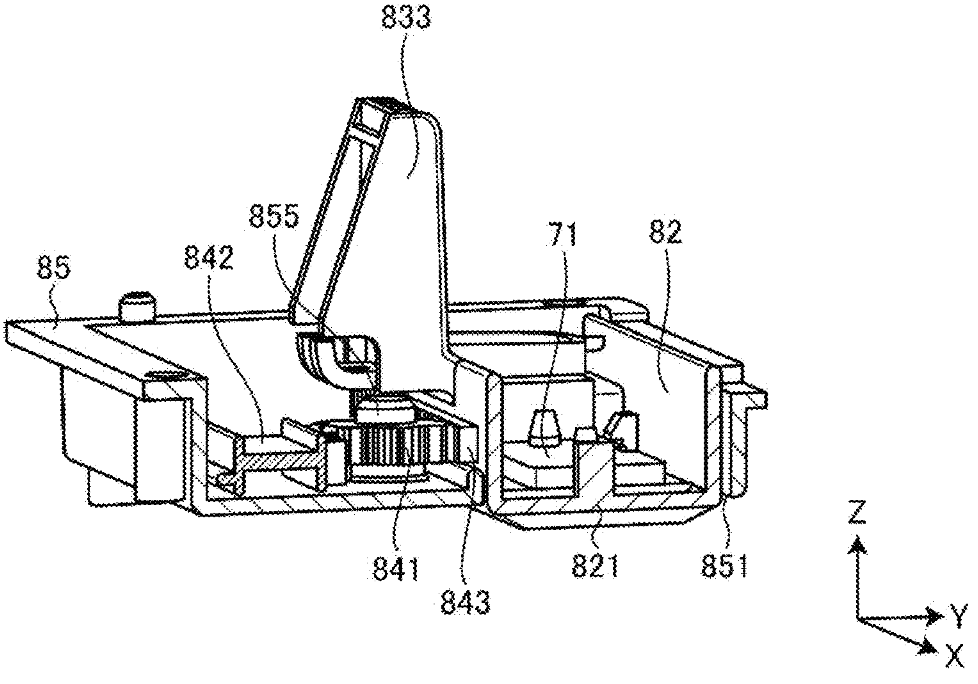
FIG. 8 is a partial cross-sectional view of the inside of the front unit casing.

FIG. 7 is a perspective view showing the inside of the front unit casing 85. FIG. 8 is a view showing the inside of the front unit casing 85 in a partial cross-section. The front unit casing 85 has a box shape with an open upper surface, and the first sensor holder 82, the pinion gear 841, the interlocking rack 842, and the like are accommodated therein.

A rectangular protruding portion 821 is provided at the bottom of the first sensor holder 82. A rectangular opening 851 is formed in the front unit casing 85. The dimension of the opening 851 in the depth direction or the Y-axis direction is substantially the same as that of the protruding portion 821. The sheet width direction or the X-axis direction dimension of the opening 851 is longer than the protruding portion 821 and corresponds to the length of the movable range of the first sensor holder 82.

The protruding portion 821 is fitted into the opening 851 and is slidably movable along the longitudinal direction or the sheet width direction of the opening 851. The opening 851 guides the first sensor holder 82 so as to be movable along the sheet width direction. As described above, the front unit casing 85 supports the first sensor holder 82 so as to be movable in the sheet width direction.

The pinion gear 841 is a gear having a small diameter and is rotatably supported by a shaft 855 standing at a central portion of the front unit casing 85. A rack 843 meshing with the pinion gear 841 is disposed on the surface of the first sensor holder 82 facing the pinion gear 841. The interlocking rack 842 meshes with the pinion gear 841, faces the rack 843, and sandwiches the pinion gear 841 with the rack 843. The pinion gear 841, the interlocking rack 842, and the rack 843 constitute a rack and pinion structure.

Although not shown here, the interlocking rack 842 and the pinion gear 841 are covered from above by a rail member 832 (see FIG. 5). Further, a hole 835 is provided in the center portion of the rail member 832 in the sheet width direction, and the shaft 855 is fitted into the hole 835. The rail member 832 presses the pinion gear 841 fitted to the shaft 855 from above to prevent the pinion gear 841 from falling off.

The first sensor holder 82 includes a pinch 833 paired with the pinch 831. At the lower end of the pinch 833, the lower end of the pair of pinches 831 is pivotally mounted by an axle, and a torsion spring attached to the axle biases the pinches 831 and 833 in the direction away from each other at their tips.

Figure 9:
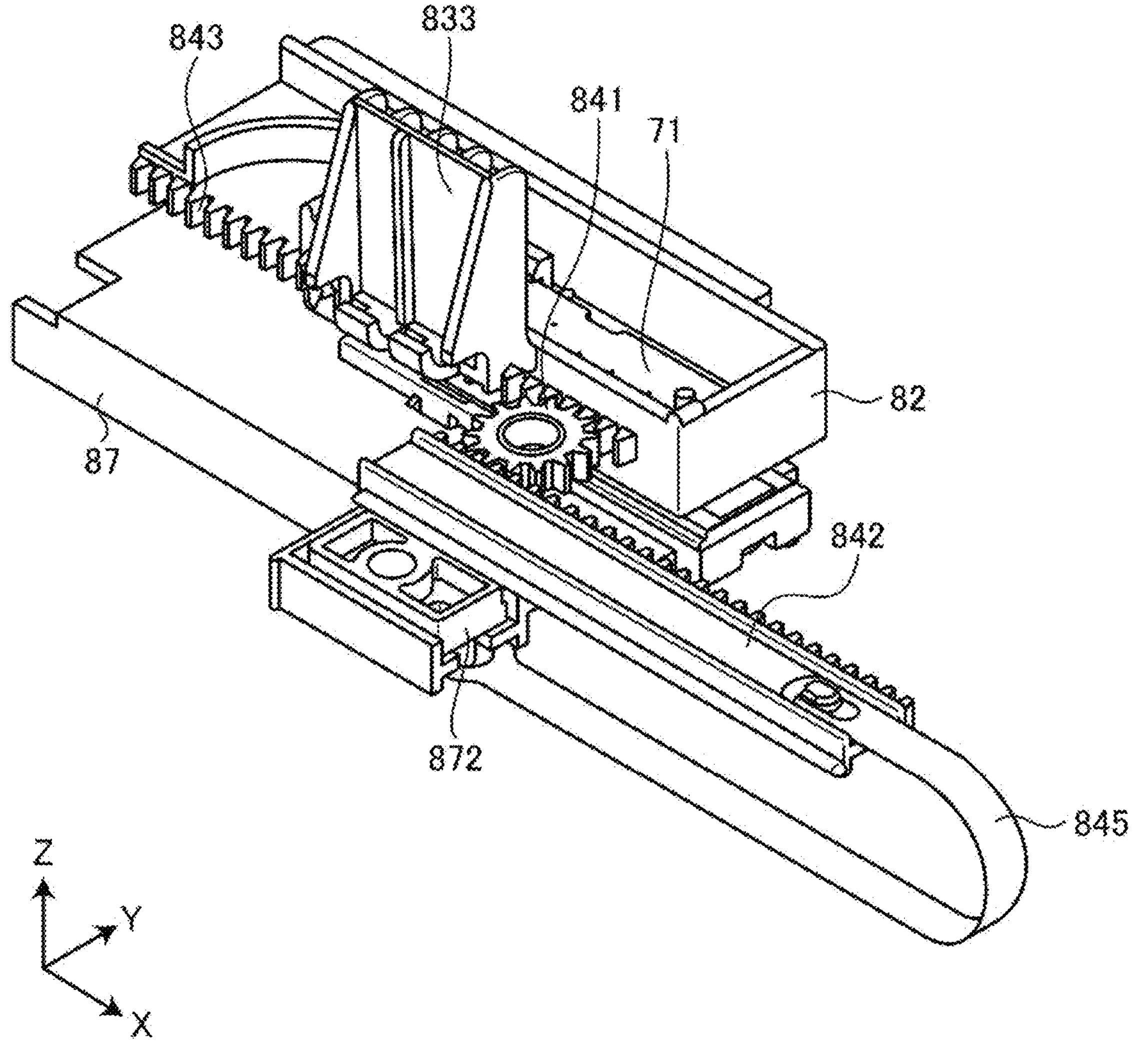
FIG. 9 is a diagram illustrating a connection relationship between a first sensor holder and a second sensor holder.
Figure 10:
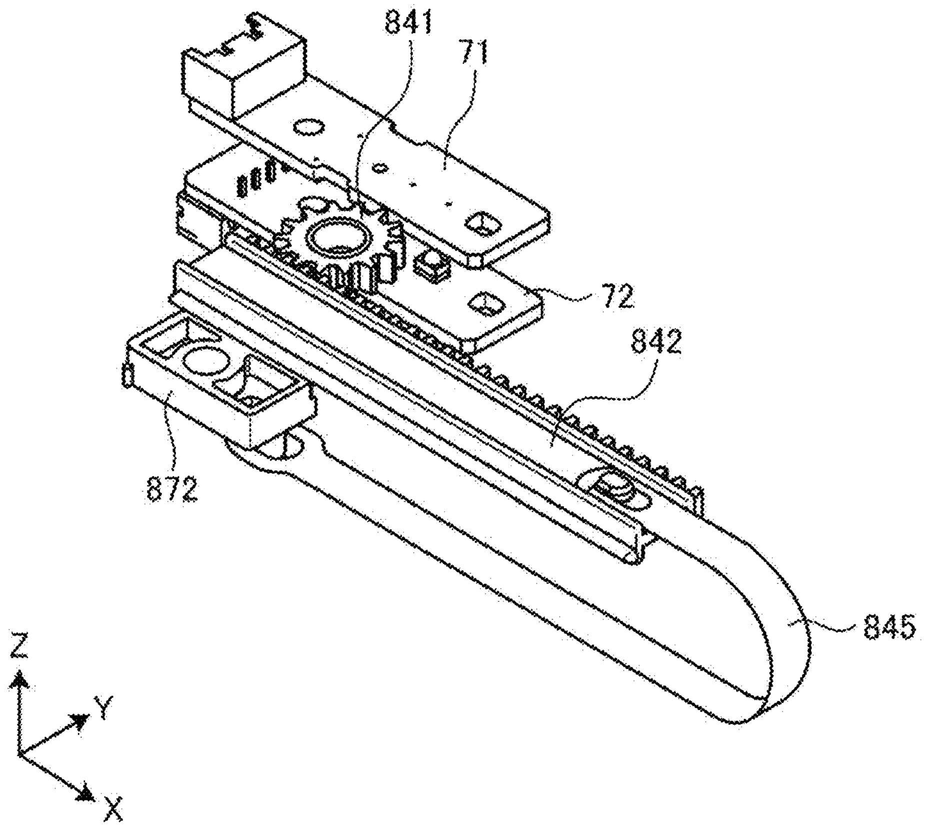
FIG. 10 is a view showing an overlapping state of a first sensor substrate and a second sensor substrate in the height direction except for the first sensor holder from FIG. 9.

FIG. 9 is a diagram illustrating a connection relationship between the first sensor holder 82 and the second sensor holder 87. Further, FIG. 10 is a view showing an overlapping state in the height direction of the first sensor substrate 71 and the second sensor substrate 72 except for the first sensor holder 82 from FIG. 9.

The first sensor holder 82 and the second sensor holder 87 are connected to each other by a rack-and-pinion structure and are interlocked with each other. The movement of the first sensor holder 82 along the sheet width direction or the X-axis direction is transmitted to the interlocking rack 842 by the rack 843 and the pinion gear 841, and thereby the interlocking rack 842 moves in the opposite direction to the movement direction of the first sensor holder 82.

The detection position adjustment unit 8 further includes a connecting member 845. The interlocking rack 842 is coupled to the second sensor holder 87 by the connecting member 845. The second sensor holder 87 is located below the interlocking rack 842. The connecting member 845 is a belt-like or string-like member having flexibility and no stretchability in the length direction, and is, for example, a leaf spring. The connecting member 845 surrounds the peripheral edge portion of the back unit casing 86 in a state of being bent in a substantially U-shape, and connects the interlocking rack 842 positioned on the back unit casing 86 and the second sensor holder 87 positioned below the back unit casing 86.

The substantially U-shaped flexure part of the connecting member 845 is supported from the inner peripheral side of the flexure by a semicircular portion 865 (see FIG. 13) to be described later, and maintains its position and shape. The connecting member 845 has one end fixed to the second sensor holder 87 by a fixing member 872 and a screw 873 (see FIG. 6). The second sensor substrate 72 is fixed to the second sensor holder 87 by a fixing member 874 (see FIG. 6).

Figure 11:
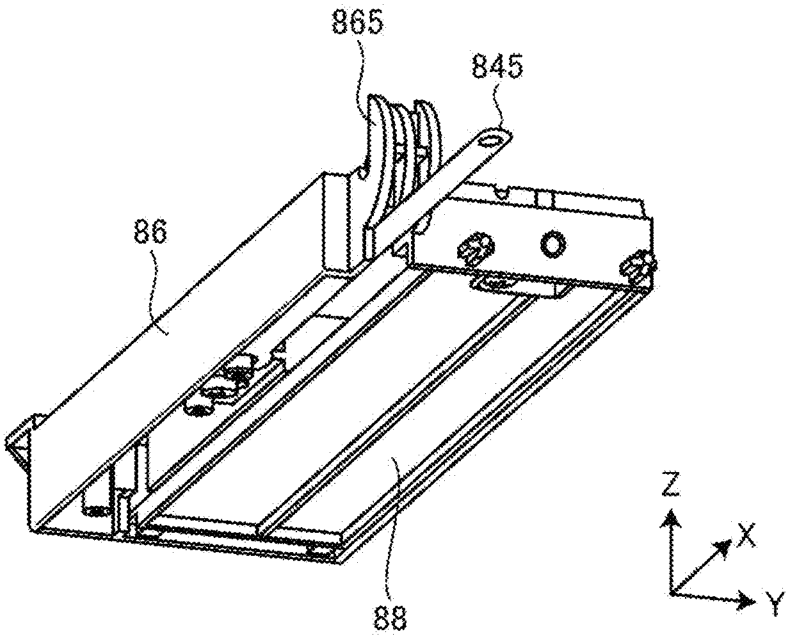
FIG. 11 is an oblique perspective view showing inside of a back unit casing.
Figure 12:
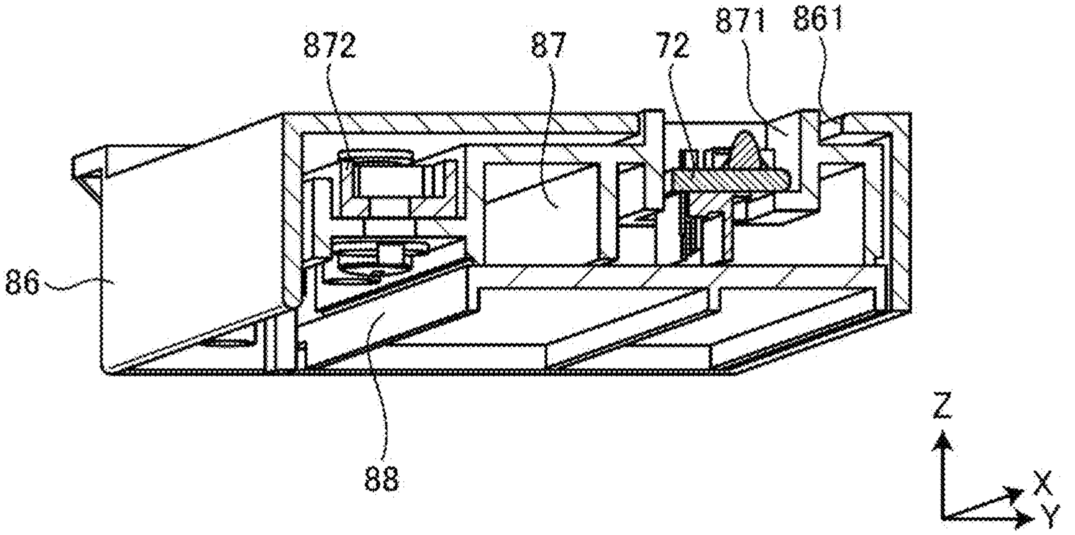
FIG. 12 is a partial cross-sectional view of the inside of the back unit casing.
Figure 13:
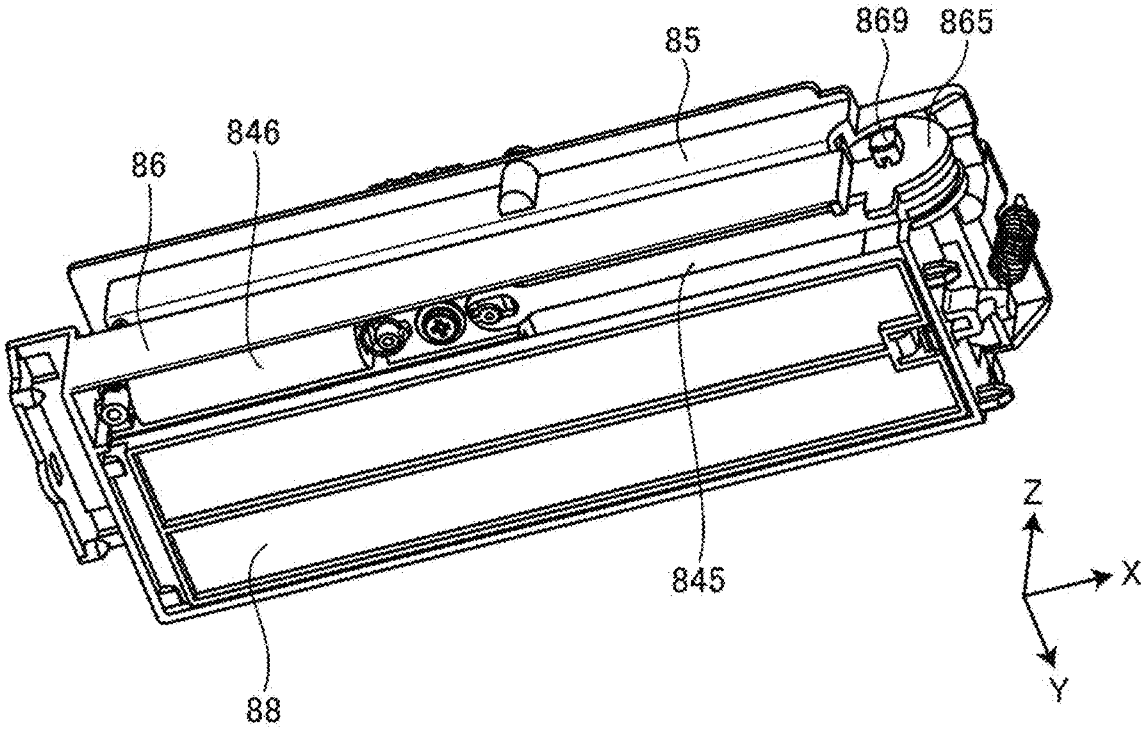
FIG. 13 is a bottom perspective view of a stack from the front unit casing to the back unit cover.

FIG. 11 is a perspective view showing the inside of the back unit casing 86 viewed from obliquely below. FIG. 12 is a view showing the inside of the back unit casing 86 in a partial cross-section. FIG. 13 is a bottom perspective view of a stack from the front unit casing 85 to the back unit cover 88.

The back unit casing 86 has a box-shaped shape having an open lower surface, and the second sensor holder 87, the second sensor substrate 72, the back unit cover 88, and the like are housed therein.

A rectangular protruding portion 871 is provided on the upper surface of the second sensor holder 87. A rectangular opening 861 is formed in the back unit casing 86. The dimension of the opening 861 in the depth direction or the Y-axis direction is substantially the same as that of the protruding portion 871. The dimension of the opening 861 in the sheet width direction or the X-axis direction is longer than the protruding portion 871 and corresponds to the length of the movable range of the second sensor holder 87.

The protruding portion 871 fits into the opening 861 and is slidably movable along the longitudinal direction or the sheet width direction of the opening 861. The opening 861 guides the second sensor holder 87 so as to be movable along the sheet width direction. As described above, the back unit casing 86 supports the second sensor holder 87 so as to be movable in the sheet width direction.

The back unit casing 86 includes the semicircular portion 865 around the rotation shaft 869. The semicircular portion 865 supports a portion of the connecting member 845 that is bent in a substantially U-shape from the inner peripheral side of the bending.

Figure 14A:
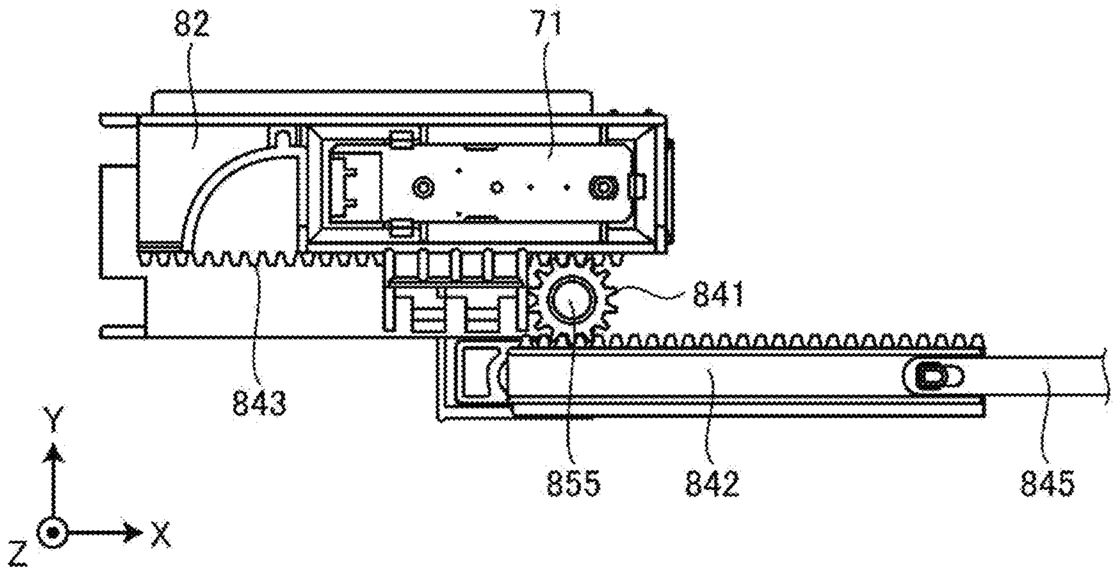
FIG. 14A is a plan view showing the first sensor holder and the second sensor holder that are closest to the leftmost end.
Figure 14B:
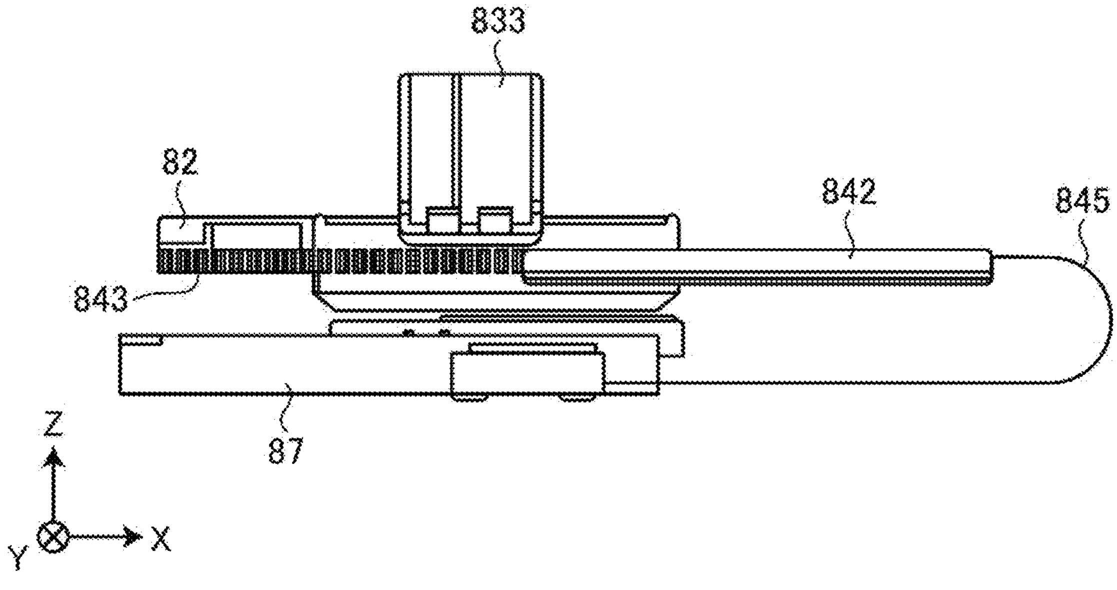
FIG. 14B is a front view showing the first sensor holder and the second sensor holder that are closest to the leftmost end.
Figure 15A:
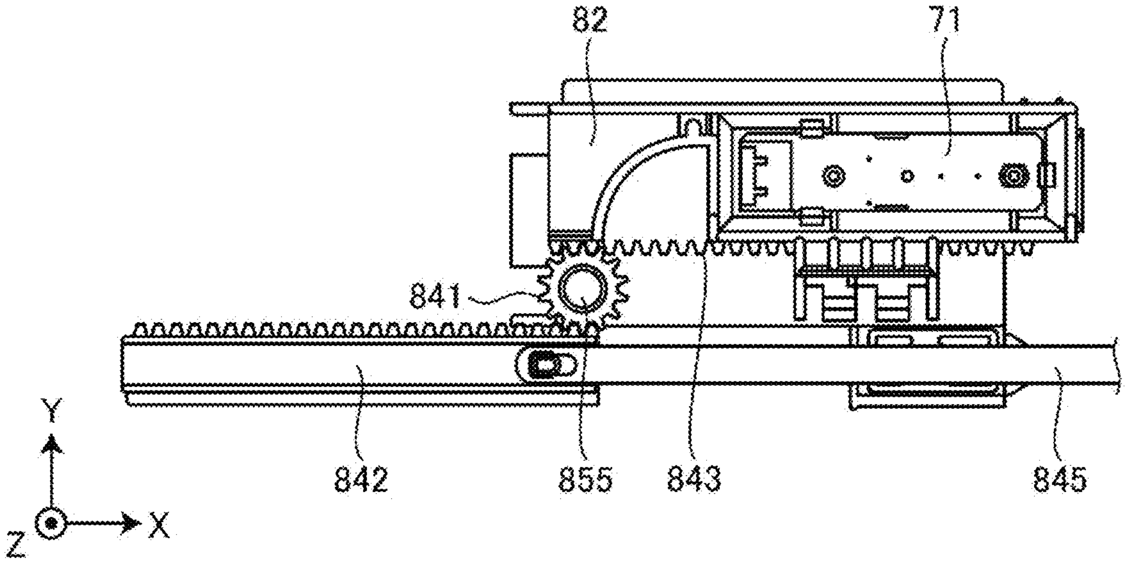
FIG. 15A is a plan view showing the first sensor holder and the second sensor holder that are closest to the rightmost end.
Figure 15B:
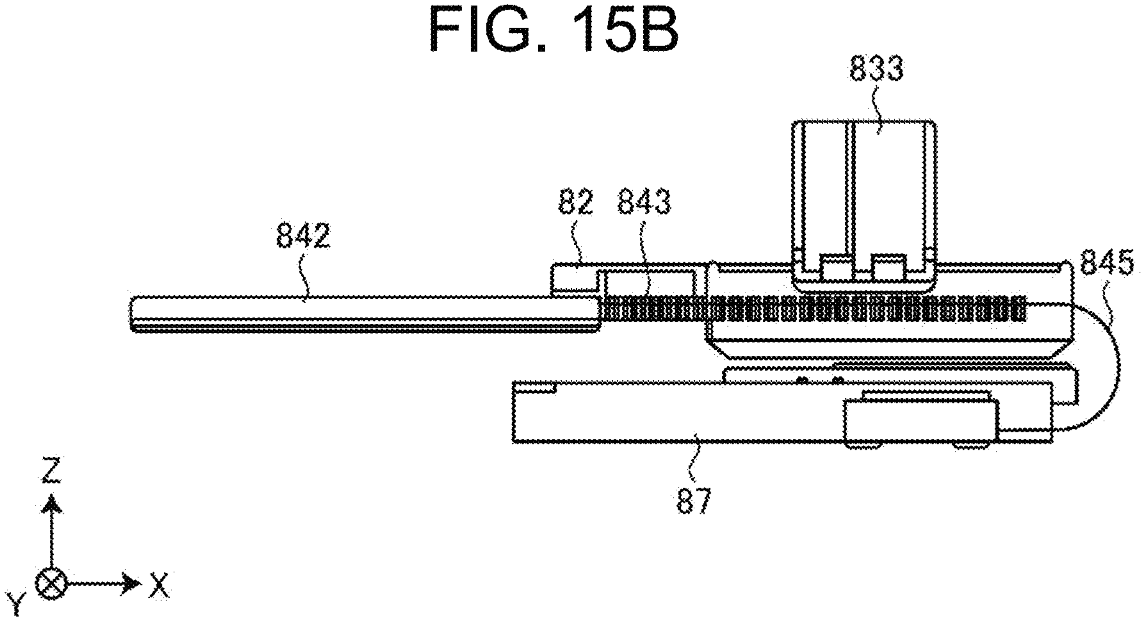
FIG. 15B is a front view showing the first sensor holder and the second sensor holder that are closest to the rightmost end.

FIG. 14A is a plan view showing the first sensor holder 82 and the second sensor holder 87 that are closest to the leftmost end. FIG. 14B is a front view showing the first sensor holder 82 and the second sensor holder 87 that are closest to the leftmost end. FIG. 15A is a plan view showing the first sensor holder 82 and the second sensor holder 87 that are closest to the rightmost end. FIG. 15B is a front view showing the first sensor holder 82 and the second sensor holder 87 that are closest to the rightmost end.

The movement of the first sensor holder 82 along the sheet width direction or the X-axis direction is transmitted to the interlocking rack 842 by the rack 843 and the pinion gear 841, and thereby the interlocking rack 842 moves in the opposite direction to the movement direction of the first sensor holder 82. Movement of the interlocking rack 842 is transmitted to the second sensor holder 87 by the connecting member 845, and the second sensor holder 87 moves in a direction opposite to the moving direction of the interlocking rack 842. Therefore, the second sensor holder 87 and the first sensor holder 82 move in the same direction.

As shown in FIGS. 14 and 15, when the first sensor holder 82 and the second sensor holder 87 are located at the leftmost end or the rightmost end of the movable range thereof, the interlocking rack 842 is located at the rightmost end or the leftmost end of the movable range thereof. That is, at this time, the first sensor holder 82, the second sensor holder 87, and the interlocking rack 842 are located farthest from each other and closer to the opposite end and end.

Figure 16:
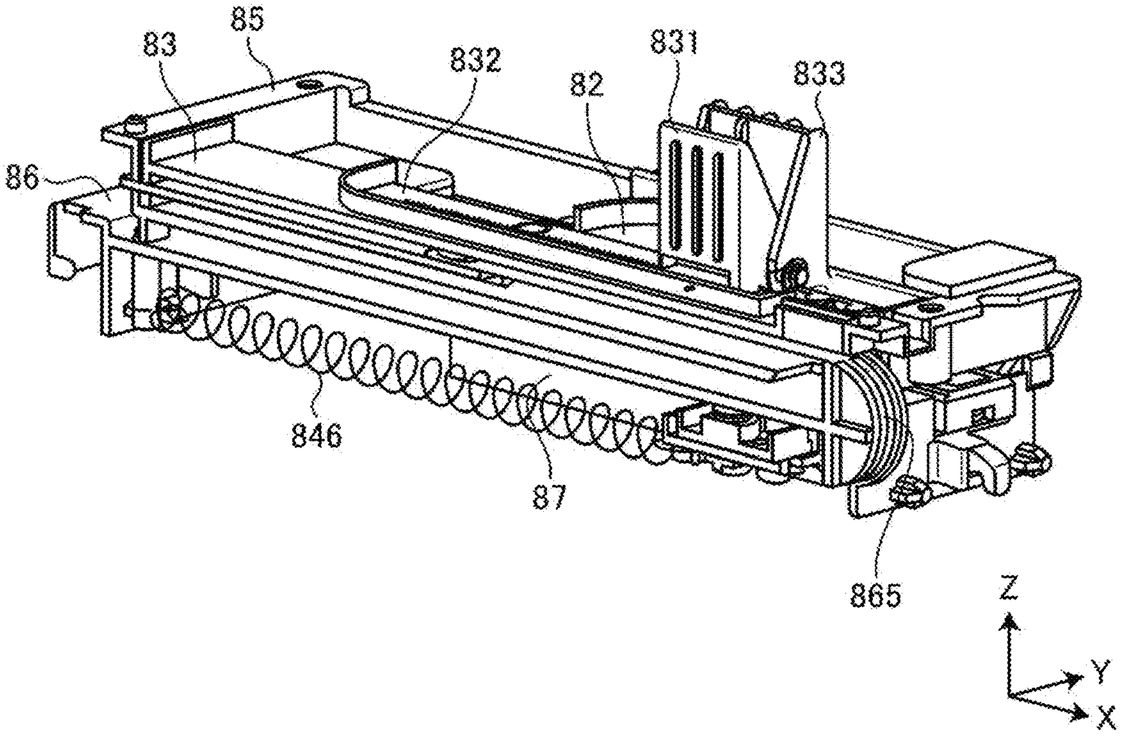
FIG. 16 is a perspective view showing a cross section along the sheet width direction, although a rail member is overlapped with a back unit cover.

FIG. 16 is a perspective view showing a cross section along the sheet width direction, although the rail member 832 is stacked to the back unit cover 88. The detection position adjustment unit 8 further includes a biasing member 846. The biasing member 846 biases the second sensor holder 87 in a direction in which a tensile force is applied to the connecting member 845.

The biasing member 846 is, for example, a helical spring. The biasing member 846 is, for example, a tension spring, and is connected at one end to the second sensor holder 87 and at the other end to the back unit casing 86. Thus, the biasing member 846 biases the second sensor holder 87 toward one side (e.g., the left end) of the movable range in the back unit casing 86.

Since the second sensor holder 87 is connected to the interlocking rack 842 via the connecting member 845, the first sensor holder 82 is also biased by the biasing member 846 via the interlocking rack 842 and the pinion gear 841 toward one side (e.g., the left end) in the moving direction in the front unit casing 85.

Figure 17:
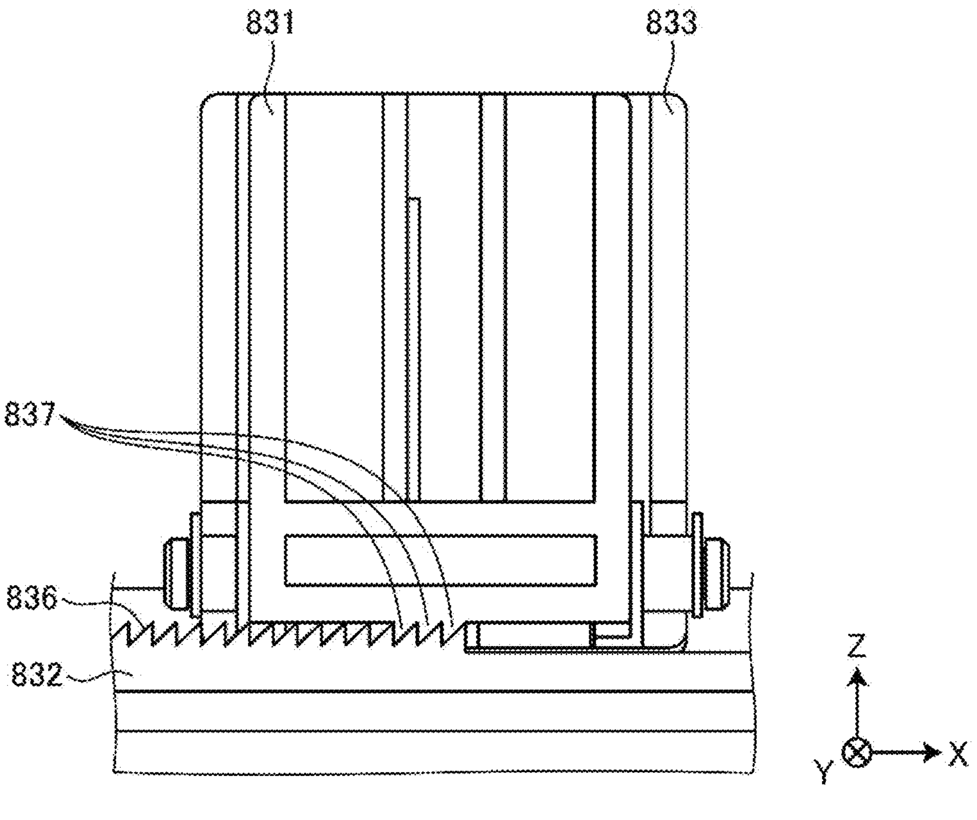
FIG. 17 is a view showing an engagement state between a serrated portion of the rail member and a serrated portion of a pinch.

FIG. 17 is a view showing an engagement state of the serrated portion 836 of the rail member 832 and the serrated portion 837 of the pinch 831, and shows a locking mechanism. The lock mechanism fixes the positions of the members that are movable in the sheet width direction included in the detection position adjustment unit 8, and fixes the first sensor holder 82 so as not to be movable in the sheet width direction.

The rail member 832 is formed with a serrated portion 836. The serrated portion 836 meshes with the serrated portion 837 provided at the bottom of the pinch 831. Both of the serrated portions 836 and 837 have a serrated shape in which the inclined surfaces upward from the lower left to the upper right and the surfaces along the height direction are alternately continuous along the sheet width direction or the X-axis direction. As a result, as shown in FIG. 17, the ZX cross section of the serrated portions 836 and 837 has a substantially right-angled triangular shape continuous in the X-axis direction. Incidentally, the inclined surface of the serrated portion 836 is upward, the inclined surface of the serrated portion 837 is downward.

The serrated portion 836 and the serrated portion 837 mesh with each other such that the tip portion and the root portion in the height direction or the Z-axis direction overlap each other. The meshed serrated portion 836 and the serrated portion 837 are in contact with each other in the inclined surface described above, by sliding the inclined surface, the serrated portion 837 with respect to the serrated portion 836, the downstream side of the X-axis or the right direction in which the value increases.

As described above, the serrated portion 836 and the serrated portion 837 constitute a ratchet structure. That is, in a state in which the serrated portion 836 and the serrated portion 837 are engaged with each other, the pinch 831 is movable only in one direction (i.e., the downstream direction in the X-axis direction) with respect to the rail member 832, and cannot move in the reverse direction (i.e., the upstream direction in the X-axis direction).

The biasing by the biasing member 846 is in the upstream direction in the X-axis direction (i.e., the leftward direction). Therefore, the biasing of the biasing member 846 acts in a direction in which the meshing between the serrated portion 836 and the serrated portion 837 becomes deeper.

Needless to say, the left and right in the above description may be reversely configured in the implementation.

The pinch 831 and the pinch 833 protrude upward from the opening 811 provided in the front unit cover 81. The pinch 831 and the pinch 833 function as a knob for hanging a hand when the first sensor holder 82 is slid relative to the front unit casing 85.

The pinch 831 and the pinch 833 are rotatably connected to each other at a lower end thereof by a shaft, and the pinch 831 is biased against the pinch 833 by a torsion spring attached to the shaft in a direction in which the serrated portion 837 of the pinch 831 meshes with the serrated portion 836. By pinching the upper ends of the pinch 831 and the pinch 833 toward each other, the meshing of the serrated portion 836 and the serrated portion 837 is released, and the first sensor holder 82 is slidable with respect to the front unit casing 85.

In such a configuration, the operator using the printer 1 adjusts the position of the detection unit 7 in accordance with the position of the black mark 95 provided on the sheet 90 in the sheet width direction when the roll sheet 9 is inserted into the sheet storage unit 3.

At this time, the operator pinches the distal end portion of the pinches 831 and 833 and rotates the pinch 831 with respect to the pinch 833. As a result, the meshing between the serrated portion 836 and the serrated portion 837 is released, and the first sensor holder 82 can be moved in the left-right direction or the sheet width direction.

The movement of the first sensor holder 82 is transmitted to the second sensor holder 87 via the rack 843, the pinion gear 841, the interlocking rack 842, and the connecting member 845, and the second sensor holder 87 also moves in the same direction as the movement of the first sensor holder 82. As a result, the first sensor substrate 71 and the second sensor substrate 72 move while maintaining a state of being overlapped in the height direction.

When the operator positions the first sensor holder 82 at a desired position, the operator releases the pinch 831,833. This causes the pinch 831 to pivot and the serrated portion 837 of the pinch 831 to engage the serrated portion 836 of the rail member 832. In this state, since the biasing of the biasing member 846 acts, the first sensor holder 82 does not move unless a force is applied to slide the inclined surface of the serrated portions 836 and 837 against the biasing force of the biasing member 846. As a result, the position of the detection unit 7 in the sheet width direction is positioned.

As described above, according to the present embodiment, it is possible to suppress the space occupied by the structure (i.e., the detection position adjustment unit 8) that enables the position of the detection unit 7 that detects the position of the sheet 90 in the length direction to be adjusted in the sheet width direction.

The above-described embodiments can be appropriately modified and implemented by changing a part of a configuration or a function of each of the above-described apparatuses.

For example, a portion having a rack-and-pinion structure in the embodiment may be realized by a different configuration. For example, even if the interlocking rack 842 and the rack 843 have no teeth and are flat, and the pinion gear 841 is a roller-like member having elasticity, the same operation can be performed.

In addition, in a case where there is a member that surrounds the movement path of the connecting member 845 in the above-described embodiment, the biasing member 846 is not essential. In addition, when the biasing member 846 is provided, the connecting member 845 may be a wire, a belt-like member, or a string-like member, even if it is not a leaf spring. However, the leaf spring is preferable because it has high durability and is suitable for long-term use.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A sheet conveying apparatus comprising:

a roller for conveying a sheet along a conveyance path;

a first sensor holder including a first sensor element that faces a first surface of the sheet when the sheet is conveyed, the first sensor holder being movable along a first direction that is perpendicular to the conveyance path;

a second sensor holder including a second sensor element that faces a second surface of the sheet when the sheet is conveyed, the second surface being opposite to the first surface, the second sensor holder being movable along the first direction;

an interlocking member mechanically connected to the first sensor holder such that when the first sensor holder translates in one direction along the first direction, the interlocking member concurrently translates along the first direction in a direction opposite to said one direction of the first sensor holder; and a connecting member that is bent to partially surround the conveyance path and connects the interlocking member and the second sensor holder such that when the interlocking member translates in one direction along the first direction, the second sensor holder concurrently translates along the first direction in a direction opposite to said one direction of the interlocking member.

2. The sheet conveying apparatus according to claim 1, wherein the connecting member extends along the first direction and has flexibility in a direction that is transverse to the first direction and no stretchability in the first direction.

3. The sheet conveying apparatus according to claim 2, wherein the connecting member is a leaf spring.

4. The sheet conveying apparatus according to claim 1, wherein the first sensor holder is movable between a first position and a second position, and the second sensor holder is movable between a third position and a fourth position that respectively correspond to the first and second positions.

5. The sheet conveying apparatus according to claim 4, further comprising:

a biasing member that is connected to the second sensor holder and that biases the second sensor holder towards the third position when the second sensor holder is moved towards the fourth position.

6. The sheet conveying apparatus according to claim 1, further comprising:

a pinch for moving the first sensor holder along the first direction.

7. The sheet conveying apparatus according to claim 6, further comprising:

a rail along which the first sensor holder moves, the rail including a serrated portion that can mesh with a serrated portion of the pinch to restrict movement of the first sensor holder.

8. The sheet conveying apparatus according to claim 1, wherein the first sensor element is one of a lighting element and a light receiving element, and the second sensor element is the other of the lighting element and the light receiving element.

9. The sheet conveying apparatus according to claim 1, further comprising:

a sheet holder for holding the sheet in a wound state.

10. A sheet conveying apparatus comprising:

a roller for conveying a sheet along a conveyance path;

a first sensor holder including a first sensor element that faces a first surface of the sheet when the sheet is conveyed, the first sensor holder being movable along a first direction that is perpendicular to the conveyance path;

a second sensor holder including a second sensor element that faces a second surface of the sheet when the sheet is conveyed, the second surface being opposite to the first surface, the second sensor holder being movable along the first direction;

an interlocking member mechanically connected to the first sensor holder such that the interlocking member and the first sensor holder move concurrently in opposite directions along the first direction;

a connecting member that is bent to partially surround the conveyance path and connects the interlocking member and the second sensor holder such that the interlocking member and the second sensor holder move concurrently in opposite directions along the first direction; and a pinion gear by which the interlocking member is connected to the first sensor holder, wherein the pinion gear meshes with a rack of the first sensor holder that extends along the first direction and a rack of the interlocking member that extends along the first direction.

11. A printer comprising:

a roller for conveying a sheet along a conveyance path;

a print head for printing an image on the conveyed sheet;

a first sensor holder including a first sensor element that faces a first surface of the sheet when the sheet is conveyed, the first sensor holder being movable along a first direction that is perpendicular to the conveyance path;

a second sensor holder including a second sensor element that faces a second surface of the sheet when the sheet is conveyed, the second surface being opposite to the first surface, the second sensor holder being movable along the first direction;

an interlocking member mechanically connected to the first sensor holder such that when the first sensor holder translates in one direction along the first direction, the interlocking member concurrently translates along the first direction in a direction opposite to said one direction of the first sensor holder; and a connecting member that is bent to partially surround the conveyance path and connects the interlocking member and the second sensor holder such that when the interlocking member translates in one direction along the first direction, the second sensor holder concurrently translates along the first direction in a direction opposite to said one direction of the interlocking member.

12. The printer according to claim 11, further comprising:

a pinion gear by which the interlocking member is connected to the first sensor holder, wherein the pinion gear meshes with a rack of the first sensor holder that extends along the first direction and a rack of the interlocking member that extends along the first direction.

13. The printer according to claim 11, wherein the connecting member extends along the first direction and has flexibility in a direction that is transverse to the first direction and no stretchability in the first direction.

14. The printer according to claim 13, wherein the connecting member is a leaf spring.

15. The printer according to claim 11, wherein the first sensor holder is movable between a first position and a second position, and the second sensor holder is movable between a third position and a fourth position that respectively correspond to the first and second positions.

16. The printer according to claim 15, further comprising:

a biasing member that is connected to the second sensor holder and that biases the second sensor holder towards the third position when the second sensor holder is moved towards the fourth position.

17. The printer according to claim 11, further comprising:

a pinch for moving the first sensor holder along the first direction.

18. The printer according to claim 17, further comprising:

a rail along which the first sensor holder moves and including a serrated portion that can mesh with a serrated portion of the pinch to restrict movement of the first sensor holder.

19. The printer according to claim 11, wherein the print head forms an image based on a signal that is output from the first sensor element or the second sensor element.

20. The printer according to claim 19, further comprising:

an ink ribbon holder for holding an ink ribbon, wherein the print head transfers ink from the ink ribbon to the sheet based on the signal.

* * * * *